United States Patent [19]
Auston et al.

[11] 3,899,428
[45] Aug. 12, 1975

[54] MILLIMETER WAVE DEVICES UTILIZING ELECTRICALLY POLARIZED MEDIA

[75] Inventors: David Henry Auston, Mountainside; Alastair Malcolm Glass, Millington, both of N.J.

[73] Assignee: Bell Telephone Laboratories, Incorporated, Murray Hill, N.J.

[22] Filed: Mar. 7, 1972

[21] Appl. No.: 232,407

[52] U.S. Cl. .............. 250/199; 307/88.3; 332/7.51; 357/30

[51] Int. Cl. ............................................ H01l 15/00

[58] Field of Search.................... 250/199; 307/88.3; 350/150; 331/94.5 F, 94.5 M; 332/7.51

[56] References Cited

UNITED STATES PATENTS

| | | | |
|---|---|---|---|
| 3,585,393 | 6/1971 | Duguay | 250/199 |
| 3,617,764 | 11/1971 | Patel | 307/88.3 |
| 3,621,340 | 11/1971 | Singh | 307/88.3 |
| 3,725,811 | 4/1973 | Murphy | 331/94.5 F |

*Primary Examiner*—Stanley D. Miller, Jr.
*Assistant Examiner*—William D. Larkins
*Attorney, Agent, or Firm*—G. S. Indig

[57] ABSTRACT

Electrical impulses within the frequency range of from one to 10,000 gigahertz are generated by the change in dipole moment resulting from the excitation of an atomic or molecular species from an electronic ground state to an excited state. Such excitation results from the direct absorption of irradiating wave energy by such species within an electrically polarized—usually pyroelectric—medium. Devices based on this mechanism may be designed to modulate or demodulate carriers in the infrared and visible spectra or may serve as primary oscillators generating carriers within the described frequency range.

20 Claims, 3 Drawing Figures

MILLIMETER WAVE DEVICES UTILIZING ELECTRICALLY POLARIZED MEDIA

BACKGROUND OF THE INVENTION

1. Field of the Invention

The invention is concerned with the generation of electrical impulses either pulsed or CW within a frequency spectrum including from 1 megahertz to 10 terahertz or the equivalent pulse spectrum. Generation of such impulses may accomplish a variety of functions, inter alia, the modulation or demodulation of electromagnetic carriers in the infrared or visible spectra and the generation of carriers within the described range.

2. Description of the Prior Art

The accelerating pace of development in the electronic arts has carried with it a concomitant increase in carrier frequency and in bandwidth of electromagnetic radiation for a variety of uses. Impetus comes from a variety of directions. For example, the rapid development of both mass and private communication systems, has imposed ever increasing demands for more communication channels. At this time it is common to frequency multiplex in a variety of systems providing a plurality of carriers. Within the past decade, carrier frequencies in common use, for example, in microwave transmission systems, have increased to a range of the order of 10 to 60 gigahertz.

Popularization of the laser oscillator in the early sixties suggested the exciting possibility of still higher carrier frequencies, and, therefore, in broader band transmission lines, and there has been considerable research directed to systems for modulating and demodulating coherent light so as to take advantage of the inherent broad-band possibilities.

Interest in further increasing the upper frequency limit of electrical impulses includes both pulsed and continuous (CW) energy. Possible use of such impulses is not limited to communications but may concern scientific instrumentation, for example, involving rapid electronic gating, which may serve the function of time resolution of absorption and/or emission spectra yielded by excitation of a variety of chemical species. Other uses include short distance systems, as in computers, in-house communications, etc. Mechanisms utilized to perform any of the foregoing functions are many. In light communications, for example, they involve electro-optics, magneto-optics and acoustooptics. More conventional techniques in commercial use at this time, particularly for generating carriers, involve a variety of approaches utilizing semiconductivity, e.g., Gunn effect, IMPATT diodes, step recovery diodes, et.

Devices still in the experimental state include Josephson junction oscillators and pyroelectric devices. A review article describing the latter class in which the nalization of energy results in the generation of electrical impulses is set forth in *Proceedings on the Symposium on Submillimeter Waves*, Polytechnic Institute of Brooklyn, N.Y., Polytechnic Press, p. 294 (1970).

From a practical standpoint, it has been difficult to generate pulses in the range of from about 100 gHz to above 1000 gHz. From the low frequency end, the most notable advance is probably the klystron which may yield milliwatts of power at frequencies as high as about 300 gHz. From the other direction, development of far infrared gas lasers has resulted in the generation of radiation down to the frequency of the order of 1000 gHz and lower.

While in-roads have certainly been made in this "forbidden" band, devices thus far developed are generally expensive and inefficient and, are generally incapable of operating at power levels above the order of milliwatts in CW operation. Pulse sources operating at the equivalent repetition rate are essentially unavailable.

SUMMARY OF THE INVENTION

In accordance with the invention, a variety of devices are made to operate over a broad frequency range which, at its lower end, may be of the order of a megahertz and which, at its upper end, may be as high as 10,000 gHz. Such devices may serve a variety of functions, e.g., generation of CW electromagnetic radiation, modulated or unmodulated within the described range, generation of pulsed radiation with components representing a broad band within that range, and modulation and demodulation of carriers generally in the infrared or visible spectra, with such modulation frequencies within the said range. Modulation or demodulation may be CW or pulsed, and the primary function served by such demodulation may be that of a simple detector. Devices operating with pulsed energy are of particular interest for many uses due to their extremely rapid time of response. Pulses either generated or detected may be of time duration of the order of $10^{-13}$ seconds or smaller.

Devices of the invention depend upon a novel manifestation. Operation requires the direct absorption of electromagnetic radiation by an atom or molecule to produce electronic excitation. This radiation, in most embodiments of concern, is within the infrared and visible spectra, i.e., from 10 microns through the visible to higher energies including X rays and gamma rays to wavelengths of the order of 1 angstrom or shorter. If the atomic or molecular species has a dipole moment and if the dipole moments are aligned as, for example, by reason of a poled dipolar environment the effect of such direct absorption, producing an electronically excited state, is to effect a change in dipolar moment of such species. This change in moment, which may be in either direction, occurs over a very short interval corresponding with excitation time and may be of the order of less than a picosecond or down to a femtosecond ($10^{-15}$ second) or smaller.

Preferred embodiments utilize pyroelectric media such, for example, as lithium tantalate, barium titanate—in poled form, but either single crystalline or polycrystalline—which may themselves be absorbing at the appropriate wavelength of electromagnetic radiation or which may contain absorbing dopants.

DETAILED DESCRIPTION

1. The Figures

Figure 1:
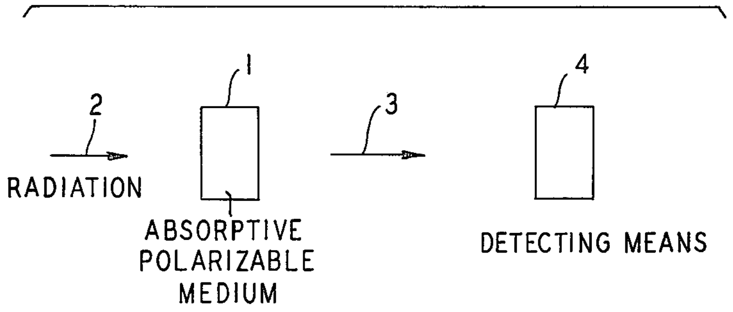
FIG. 1 is a schematic representation of one device arrangement of the invention, in accordance with which a medium, including an absorbing species, is converting incoming electromagnetic radiation into an electrical impulse which is radiated into free space.

The arrangement of FIG. 1 includes a body 1 which contains an atomic or molecular species capable of absorbing incoming electromagnetic radiation 2 so as to produce a change in electronic configuration with concomitant change in dipole moment. Such dipolar moment change is macroscopically detectable by virtue of alignment of dipoles due to a polar environment within medium 1. As described further on, this polar environment in a preferred embodiment may be due to the nature of the medium itself, as in the instance of a pyroelectric material, or may be induced by reason of an applied field by means not shown. Arrow 3 represents radiative electrical energy which is the direct consequence of the macroscopic dipolar change resulting from the electronic excitation of the appropriate absorbing species. The arrangement depicted includes a detecting means 4 which may consist, for example, of an oscilloscope, which means may include transducers and associated circuitry for accomplishing a variety of functions, such as demodulation, etc. Radiation 2 may take a variety of forms in this or other embodiments shown. It may, for example, consist of pulsed energy containing a broad band of frequency components, in which event radiation 3 may be composed of one or more pulse envelopes containing lower frequency components; it may consist of CW electromagnetic radiation also within the absorption spectrum of the appropriate species within body 1 with such CW radiation being itself modulated, in which event 3 may be CW electrical energy replicating the modulation signal; it may consist of two or more wavelengths of CW radiation both within the absorption spectrum, in which event 3 may be electrical energy of the resultant beat or difference frequency/s. Other arrangements discussed in detail further on include changing carrier frequency while retaining modulation as in heterodyneing, etc. Detecting means 4 is optionally included and may serve a variety of purposes depending upon the nature of radiation 3. It may be in close proximity to body 1 as in certain instrumentation uses or may be remote as in certain communications systems.

Figure 2:
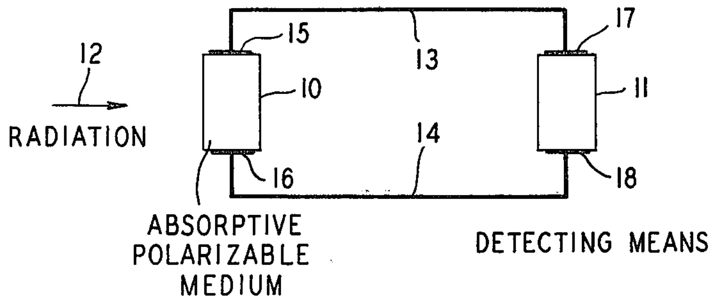
FIG. 2 is a schematic representation of a similar device in which the resulting electrical impulse is fed into wire electrodes.

FIG. 2 consists of body 10, again containing an appropriate species capable of absorbing electromagnetic radiation, of appropriate wavelength, to produce an excited state dipole and detecting means 11 which may be of any of the various types implied by the discussion of FIG. 1. For this arrangement, incoming radiation 12, which may, again, fall in any of the categories discussed, results in a converted form of energy which, in this instance, is introduced into conductive lines 13 and 14 by means of electrodes 15 and 16. Lines 13 and 14, serving to transmit such converted electrical energy may, in turn, make electrical contact to electrodes 17 and 18 which introduce such energy into means 11.

Figure 3:
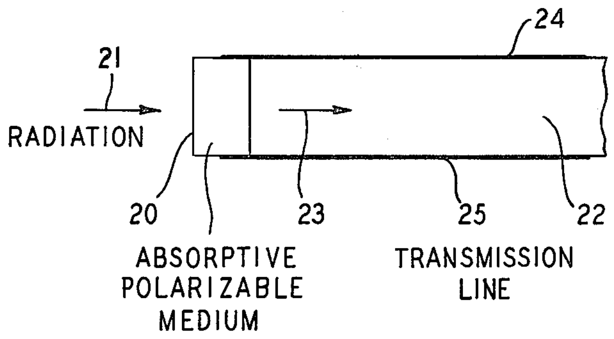
FIG. 3 is such an arrangement in which incoming electromagnetic radiation, converted by a medium in accordance with the invention, is introduced into a transmission line which, in an optimum case, is so arranged as to be nondispersive.

FIG. 3 operationally similar to the apparatus of FIGS. 1 or 2, again includes a body 20 of nature common to all devices of the invention, such body containing an appropriate absorbing species capable of undergoing an electronic transition to produce a dipole change in response to incoming radiation 21. The apparatus of this figure differs in that there is provided a transmission line 22 for transmitting converted energy 23. In a preferred embodiment, transmission line 22 is provided with longitudinally separating conductive members 24 and 25. As is well known, the effect of such members is to result in propagation of a TEM mode which is nondispersive and so minimizes smearing of energy 23.

2. Material Considerations

It has been indicated that the invention is dependent upon the direct absorption of electromagnetic radiation of appropriate wavelengths. For the purposes of the invention, such radiation must have sufficient quantum energy to produce the desired electronic excitation. Most such events require a minimum energy corresponding with a maximum wavelength of about 10 microns. The high frequency end is not limited except by ultimate destruction of the medium itself and, accordingly, may include any wavelength within the visible spectrum and beyond into the X ray and gamma ray spectra. As a practical matter, usual media would impose an ultimate limit of the order of 1 angstrom unit.

It has also been indicated that the invention is dependent upon such absorption resulting in a change in dipolar moment, which change, in one form or another, is responsible for every manifestation described. For such dipolar moment of the absorbing species to be present at all and to be seen on a macroscopic scale, requires a polar environment. Most conveniently, the polar environment is supplied by a solid state, poled material such as a single domain ferroelectric or, more broadly, pyroelectric material. This preferred embodiment may take the form of a single crystal or polycrystal, or even in a suspension contained in an inert matrix. The three categories are exemplified, for example, by lithium tantalate, $LiTaO_3$; by hot pressed lanthanum-doped mixtures of barium titanate, lead titanate, and lead zirconate, and by epoxy loaded with barium strontium niobate. Alternatives include oriented microcrystalline polymeric materials such as polyvinylidene fluoride. Alternative approaches include environments with polarization resulting from extrinsic fields, and such may be gaseous, liquid, or solid media polarized by use of biased straddling electrodes.

The absorbing species may be inherent in the medium, e.g., the polar medium or the inert medium itself, or may be the result of deliberate doping or impurity content. In either instance, such species may consist of anything at all which is compatible with the system under discussion, the only requirement being that it be capable of absorbing sufficient energy when contained at some desirable concentration level.

Regardless of the approach utilized, it is possible to specify certain minimal criteria required for practical operation. To develop a reasonable voltage due to the difference between the ground state dipole moment and the excited state dipole moment, it is necessary to have both a minimal absorption level for the radiation under consideration and also a minimal ground state dipole moment. The latter is based on the observation that a significant change in dipole moment first requires a reasonable ground state moment. Since the ground state dipole moment is not only oriented by but may, in the first instance, be due to the polarization of the medium containing the absorbing species, a practical minimal polarization value is implied.

Absorption level—the absorption for the radiation of concern—is desirably at a minimal value of at least 5 $cm^{-1}$ (indicating the radiation of concern is reduced to the fraction $1/e$ th of its incident value upon passage through 0.2 centimeter of medium, where $e$ is the natural logarithm base numerical approximately equal to 2.718). This absorption level may be characteristic of a natural absorption of the polarized medium itself or may be that of a dopant. In the usual material, the former would suggest operation at or beyond an upper frequency absorption edge (as differentiated from a low frequency edge usually due to lattice or equivalent absorption), whereas the latter would be suggestive of an absorption within the normal transparency bandwidth of the medium. In either event, the absorption is electronic and results directly in the creation of an excited electron state. It is this transition from ground to excited state upon which every working embodiment of the invention depends. In the majority of instances, spontaneously polarized media, considered preferred from the inventive standpoint, exhibit broad transparency bandwidths so that sufficient absorption at a desired wavelength of radiation in the preferred case may require dopant material. While minimal concentration of such dopant material required to reach the desired absorption varies considerably, it is generally required that the dopant level be at least 0.01 percent by weight, at least in most of the more common spontaneously polarized media.

Dipole Moment — The ground state dipole moment of the absorbing species is desirably at a level of at least 0.01 Debye units (a Debye unit is defined as a separation of 1 angstrom unit per unit charge between the charges of opposite type making up the dipole). This limit results from the observation that dipole moment of magnitude substantially less than 0.01 Debye unit for the absorbing species at the minimal concentration indicated above when excited yields a signal strength which, while measurable, is sufficiently small to be impractical for most purposes.

Medium Polarization — A working minimal polarization of the medium sufficient to produce a dipole moment of absorbing species of the order described above and, consequently, sufficient to result in a signal of substantial magnitude considered adequate for the purposes of the invention is 0.1 microcoulombs per centimeter per degree centimeter. (This is also an adequate value for alignment of inherently dipolar species.) Such polarizations are readily attained in most ferroelectric and pyroelectric media which have been considered for device applications. This polarization may also be induced in a reasonably good dielectric material (one having a dielectric constant of the order of 10 or greater) by means of an applied electric field of $10^{-5}$ volts per centimeter.

It will be appreciated that appropriate absorbing species are virtually limitless in nature. They may be atomic or molecular; they may be dopants or an inherent part of the medium. Many species which manifest strong absorptions for specified wavelengths of radiation are known. Illustrative species together with an indication of absorption wavelength follow. the atomic species listed are compatible with a variety of spontaneously polarized media in amount sufficient to attain the prescribed absorption minimum.

TABLE

| Absorbing Species | Approximate Major Absorption — Wavelength in Micrometers |
|---|---|
| $Cu^{2+}$ | 1.0 |
| $Cr^{3+}$ | 0.45, 0.65 |
| $Nd^{3+}$ | 1.06 |
| Co | 1.2, 0.5 |

Mn and Fe are absorbed throughout most of the visible spectrum (0.3 to 1 μm). Additional examples may be found in *Ligand Field Theory* by Carl J. Ballhauser, McGraw Hill, New York (1962); *Atomic Spectra of Molecules and Ions in Crystal* by Donald McClure, Academic Press, New York (1959); and *Luminescence of Organic Substances* by Landott and Bornstein, Springer Verlag, Berlin (1967).

The first category of polar media, and that considered preferred from the standpoint of the invention, is made up of spontaneously polarized materials. Such media may be conventional true pyroelectrics which may also exhibit ferroelectricity. Examples of such materials are $LiNbO_3$, $LiTaO_3$, $BaTiO_3$, triglycene sulfate, ethylene diamine tartrate either normal or deuterated, barium strontium niobate and other ferroelectric tungsten bronzes, potassium dihydrogen phosphate, ammonium dihydrogen phosphate and lithium sulphate neonohydrate. For many of the devices described herein, output energy is sufficiently low in frequency such that scattering at crystalline boundaries is not consequential. For such purposes, media may be polycrystalline as well as single crystalline. Of course, this suggests the presence of a characteristic permitting polarization of the medium. In the usual preferred embodiment, in the instance of a polycrystalline medium, where polarization is spontaneous, this generally gives rise to the requirement that the medium exhibit ferroelectricity, i.e., that it respond to an external field at some temperature so as to permit polarization.

A recently investigated class of materials evidencing polarization in the absence of an applied field is also suitable. Members of this class are organic polymers evidencing microcrystallinity in which crystallites are oriented usually by means of cold working, e.g., uniaxial or biaxial stressing. A well known member of this class is polyvinylidene fluoride.

Materials not evidencing spontaneous polarization which are nevertheless suitable should have a sufficiently high dielectric constant to result in the requisite polarization with application of an electric field of reasonable magnitude. It has been indicated that a field of $10^5$ volts per centimeter across a material of a dielectric constant, e, equal to 10 results in the desired polarization of 0.1 microcoulombs per unit area. Illustrative members of this class are titania and rutile. Normally ferroelectric materials in their paraelectric state immediately above their ferroelectric Curie temperatures may have dielectric constants of this magnitude. Particularly in this latter class of media, systems may utilize molecular rather than atomic absorbing species. Gaseous, liquid, or solid dielectric materials may be doped with, for example, organic species such as listed in *Luminescence in Organic Substances* as well as molecules such as IBr, HCl, etc.

The foregoing furnishes an adequate basis for selection of appropriate materials. Further refinement of the mechanistic explanation involved will, however, suggest the nature of the contribution made by the medium or that portion of the medium not directly involved in direct electronic absorption. It is apparent that any change in dipole moment of an absorbing species excites a change in portions of the medium within the sphere of influence of the local field associated with such component. This effect, believed generally cooperative, is partly responsible for the developed signal.

3. Operational Modes

Illustrative device embodiments are briefly described in conjunction with FIG. 1. All operations involve irradiation with electromagnetic radiation of a wavelength within an electronic absorption band of the medium. Energy ordinarily associated with electronic transitions suggest that this wavelength be no longer than about 10 micrometers. It has been indicated that no upper limit can be prescribed. To produce an AC signal, it is necessary to impose an amplitude, frequency, or phase variation on the radiation with the variation within the electronic excitation time scale. This time scale, which may be from one or more picoseconds to a femtosecond, may correspond with irradiation variation resulting from the introduction solely of pulsed energy, of modulated CW energy, or by reason of the beat or difference frequencies resulting from introduction of two or more types of radiation. The latter is accomplished by introduction of two CW beams both, of course, within the absorption spectra of the absorbing species, with a separation sufficiently close to result in a beat within the acceptable time scale. Since even the most sharply absorbing species ordinarily have absorption peaks at least 0.01 angstrom units in width, this expedient may result in beat frequencies ranging from as low as a MHz to a GHz and higher.

Any of the arrangements discussed above may result in a signal which may serve as an information signal, as a carrier for information, or which may, in turn, be detected simply as a means of measuring the presence and magnitude of irradiating energy. The signal or carrier may then be transmitted to a near or remote point and thereby serve as a communication link; or, alternatively, it may serve as a demodulating or heterodyneing arrangement for information received on the incoming radiation.

Pulsed information is particularly interesting for certain functions, and devices of the invention are capable of replicating "light" pulses of extremely short duration (of the order of $10^{-13}$ seconds and shorter). Such pulses, producible for example by use of a mode-locked laser and possibly multiplied means of an (etalon,) may serve a variety of purposes. For example, they may be utilized in a communication system, as in PCM, or they may perform a gating function, as, for example, by passage along an electro-optic transmission line or inducing a traveling pulse of induced birefringence which may, in turn, operate as a moving shutter for radiation affected by the birefringence. The invention resides generically in the generation of electrical signals due to electronic excitation producing the excited state dipole. Many uses in addition to those set forth are evident, for example, devices of the invention may serve in any matter analogous to that of a local oscillator in conventional circuitry.

4. Examples and Mechanistic Consideration

Example 1

In this example, 1.06 micrometer pulses produced by a mode-locked neodymium; glass laser are utilized as a pump source to produce electrical pulses of shape and duration similar to those produced by the laser. The absorbing species was $Cu^{2+}$ contained in a single crystal of poled lithium tantalate. Such material, evidencing an absorption coefficient of 60 $cm^{-1}$ at 1.06 $\mu m$ is cut and polished to produce a specimen having a thickness of 0.2mm and a square cross-section 0.5mm on a side. This specimen is bonded by means of a thin epoxy layer to an undoped $LiTaO_3$ crystalline electro-optic transmission line. Both the specimen containing the absorbing species and the transmission line have their polar axes aligned in the same direction normal to the broad face of the specimen. Aluminum films evaporated on opposite faces of specimen and line with such faces corresponding with polar directions result in propagation of a nondispersive TEM mode. Optical pulses produced by the laser having a duration of from 3 to 15 picoseconds and an energy of approximately 1 milli-Joule are made incident on the specimen. 1.06 $\mu m$ emission of the laser is split with a portion being passed through an SHG (second harmonic generator) to generate a 0.53 $\mu m$ pulse which is delayed with respect to that portion of the transmission irradiating the specimen. The 0.53 $\mu m$ pulse is plane polarized and made incident on the undoped $LiTaO_3$ line in a direction transverse to that of the 1.06 $\mu m$ pulse. A crossed polarizer on the exit side of the 0.53 $\mu m$ pulse together with a detector, in this instance a camera, was utilized to follow the propagating electrical pulse produced by the $Cu^{2+}$ exciting dipole along the transmission line. This Pockel's cell arrangement results in a 0.53 $\mu m$ pulse which follows the birefringence induced by the electrical pulse. The total duration of the 0.53 $\mu m$ energy recorded by the camera is determined by the coincidence period during which the electrical pulse is traveling down the line and during which the line is illuminated by the 0.53 $\mu m$ radiation. Due to the relatively high dielectric constant of the transmission line (about $\epsilon = 42$), the electrical pulse produced during excitation of the dipole of the $Cu^{2+}$ travels down the medium at about 1/42 or about 1/6.5 of the speed of light. The optical pulse (0.53 $\mu m$) is also slowed down relative to the speed of light in vacuum by the fraction $1/n$ or 1/2.2 . For the dimensions described, the coincidence time in the line is of the order of 3.6 picoseconds corresponding to a pulse length of the order of 0.5mm. The dielectric constant of the transmission line and its behavior were verified by repeating the example with several different delay times (produced by changing the path lane of the 0.53 $\mu m$ radiation). Since such variations produced only the expected change in position of the recorded pulse with no significant change of pulse length, it was verified that the line was indeed nondispersive.

Calculations based on this example, and taking into account other considerations based on other experiments and also on the geometry used, suggest an excitation dipole response time of the order of a picosecond or less. Dispersion, largely as between the components of the incoming 1.06 $\mu m$ optical pulse and between it and the developing electrical pulse for the thickness specimen utilized, imposes a minimum limit on the developed electrical pulse of the order of 3.5 picoseconds. Due to the very small dispersion, as between the components contained in the electrical pulse, it is not significantly smeared during generation in the specimen. The specimen thickness of 0.2mm was chosen to approximate the absorption length for the particular copper doping used (absorption length is defined as the distance over which 1-1/*e* of the radiation is absorbed). Heavier doping of an absorbing species (or use of a medium which is itself absorbing) permits a shorter physical dimension in the irradiation direction with the same efficiency and so permits generation of still shorter pulses. For the particular example described above, the optical pulse length of the 1.06 $\mu m$ radiation was of the order of 5 picoseconds resulting in electrical pulse length of approximately 8 picoseconds. The main limitation in this example was, therefore, the optical pulse length. Use of shorter and shorter optical pulses eventually results in output electrical pulses which attain the limit of the order of 4 picoseconds for the configuration described.

From a practical standpoint, a characteristic of most real highly polar media, i.e., the infrared absorption edge generally lying within the near infrared, imposes a limit on developed electrical pulse length (or frequency of CW energy) regardless of configuration due to absorption and the related increased dispersion of the high frequency component of electrical signals responsive to shorter optical pulses (or higher modulation frequency of optical energy). For many materials investigated, $LiTaO_3$ is fairly exemplary and imposes a limit of the order of about 0.1 picoseconds or about 3000 gHz on the developed signal for a medium sufficiently thin to be regarded as essentially nondispersive. Use of other polar materials may result in an increase in this limit by a factor of about three.

While Example 1 has been discussed largely in terms of pulse generation, it is significant to note that the pulses so generated were also detected, in this instance utilizing a simple camera as the recording means. In effect, the copper-doped specimen may be regarded as a detector, in this instance, detecting an optical pulse of a time duration of approximately 5 picoseconds.

Typical operational efficiency is indicated by the fact that the incoming 1.06 $\mu m$ radiation, at a level of about 1 milli-Joule, in one experiment, resulted in a generated pulse having a peak current of 4 ampere with a corresponding voltage of 250 volts for a 58 ohm transmission line. The peak power of the electrical pulse developed in this instance was 2 kilowatts.

Example 2

The following example involves development of an electrical signal responsive to the difference frequency due to beating of two incoming wavelengths of electromagnetic radiation, both within the absorption spectrum of, in this instance, $Cr^{3+}$ in $LiNbO_3$. Incoming radiation is at 6500 angstroms and 6504 angstroms.

In this example, signals are produced by two Q-switched lasers. The signals are quasi CW, i.e., pulse length of the order of 50 nanoseconds with power levels of the order of 50 megawatts. A crystalline section of approximate dimensions of 1mm by 1mm by 0.1mm, the latter dimension corresponding with the absorption length for a $Cr^{3+}$ doping level of approximately 1 percent by weight, is mounted inside a 300 gHz transmission line. The output signal is an essentially pure 300 gHz carrier having a power level of 2 kilowatts. Such pulses may then be utilized as communication carriers in which event they are modulated and the modulated or unmodulated signal may be detected by conventional means as, for example, by use of a point contact diode or InSb photoconductive detector.

The mechanism responsible for the invention has been identified and distinguished from other mechanisms on the basis of parameters such as time lapse (corresponding with excitation time for the responsible dipole moment and frequency response).

The competing mechanisms of primary concern are (1) the pyroelectric effect, and (2) the inverse electric-optic effect. The pyroelectric effect inherently in evidence in each of the examples described above operates on a different time scale. It is dependent on temperature change which, in turn, can result only during relaxation of the excited state dipoles (for radiation within the normal transparency bandwidth or at or above an upper absorption edge of the material). The excited dipole effect of the present invention operates on a time scale corresponding with the excitation time which is ordinarily at least one order of magnitude, and often times many orders of magnitude more rapid, than the relaxation. In fact, excitation time is so rapid that the real limitation is generally limited by the incoming energy rather than by the electronic excitation time. The $Cu^{2+}$ dopant used in Example 1 has a relaxation time of 30 picoseconds and so may result in the electrical pulses 30 picoseconds in length or longer by reason of the pyroelectric effect. The $Cr^{3+}$ of Example 2, which has a relaxation time of the order of 1 microsecond or greater, may generate difference frequncies no greater than 160 kilohertz due to the pyroelectric effect.

The inverse electro-optic effect which usually depends for reasonable efficiency on birefringent phase matching cannot be responsible for generation of electrical pulses which, by their nature, contain a broad band of frequencies and which, therefore, cannot be phase matched within a single medium at a single time. This electro-optic effect is capable of producing a pure sinusoidal output resulting, for example, from the beating arrangement of Example 2. It would be extremely inefficient utilizing the material of that example which is designed to be absorbing rather than transmissive at the wavelengths of incoming radiation and which is relatively short in the traversal direction. Of course, no attempt has been made to phase match so as to enhance the electro-optic effect, and the two effects, even disregarding differences in efficiency, can be separated by changing the beat frequency. The inverse electro-optic output is significantly frequency dependent with a developed signal essentially neglibible for poor matching conditions, while the excited dipole mechanism results in a developed signal which is essentially independent of frequency.

It may be generally stated that the regime in which effect usage of the excited dipole mechanism operates differs from that in which similar usage is made of the inverse electro-optic effect. For example, for materials of the nature considered in the selected examples, i.e., spontaneously polarized media containing dopant absorbing species, the excited dipole mechanism surpasses the inverse electro-optic effect at frequencies at and below about a thousand or a few thousand gigahertz. It has been indicated that the excited dipole mechanism utilizing such materials may take the form of an active element which is of the order of 0.1 mm thick, with that dimension corresponding with an absorption length related to a peak absorption lying within the material transparency bandwidth of the spontaneously polarized medium. Under these constraints, the inverse electro-optic effect is small. Even if the birefringence of the medium is accidentally or by design such as to effectively phase match, a significant part of the energy, i.e., 1 - 1/*e* is available only over a relatively thin crystalline portion in the traversal direction; a length over which the inverse electro-optic signal may not be developed to a substantial magnitude. However, at frequencies an order of magnitude or more higher, i.e., above about 10 terahertz, the electro-optic effect may dominate, particularly where phase matching conditions are appropriate. Of course, use of higher doping levels or, more significantly, of media which themselves include the absorbing species, may result in shorter absorption lengths and thereby increase the frequencies of the crossover between the two mechanisms.

Due to the dependence of the electro-optic effect on phase matching, this mechanism may easily be distinguished from the inventive mechanism. Whereas the excited dipole signal is essentially frequency and crystal orientation independent, the electro-optic signal is, of course, sharply frequency dependent and evidences rapid fall off on departure from phase matching.

Examples and the drawing have been described in terms of specific embodiments, so, for example, energizing means has generally consisted of one or more lasers operating CW or pulsed. By the same token, detecting means discussed only briefly have generally been concerned with prosaic devices readily available to illustrate the inventive effect. It has, however, been indicated concerned with prosaic devices readily available to illustrate the inventive effect. It has, however, been indicated that the mechanism of the invention may be utilized to a variety of ends. It is clear that energizing means may include incoherent radiation, in which event, the dipole excitation may be responsive to a coherent component or to a modulation signal which, in such instance, would probably take the form of an amplitude variation. Excitation and detection positions may be proximate, as in the instance of a short haul communication system or gating apparatus for instrumentation, or may be remote, as in some communications systems. Accordingly, energizing means may take the form of an oscillator, e.g., a laser oscillator, an antenna of electronic or optical nature, a filter or lens system, etc. Detection means may take any form suitable to any of the purposes enumerated or otherwise apparent. As indicated, such detecting means may even include a local oscillator as for heterodyening or other purpose, and such may, in fact, include a device working in accordance with the described exciting dipole mechanism.

What is claimed is:

1. Apparatus comprising a transducer for altering incoming electromagnetic radiation provided with first means for receiving radiation and second means for emitting the altered energy, said radiation being within a range having a maximum wavelength of 10 micrometers and manifesting a variation in input radiation intensity on a time scale corresponding with a cycle time of up to about 10 terahertz, said transducer being so adapted as to emit an electrical signal having an electric field variation corresponding to the said variation, characterized in that said transducer consists essentially of a body which is capable of manifesting electrical polarization on a macroscale and containing an absorbing species having a maximum absorption length for the said radiation of about 0.2cm, substantially the entirety of the absorption responsible for the said absorption length being due to a change in electronic configuration from a ground state to an excited state within the said absorbing species, the said absorbing species having a dipole moment in the ground state of at least 0.01 Debye when the environment of the absorbing species within the said body is polar, whereby electronic excitation results in an electrical impulse with the net electrical signal representing net effect of the totality of such impulses responsive to the said variation of incoming electromagnetic radiation said second means including means for coupling said electrical signal to utilization means.

2. Apparatus of claim 1 in which the said incoming radiation includes a pulsed component.

3. Apparatus of claim 2 in which the incoming radiation consists essentially of the said pulsed component.

4. Apparatus of claim 3 in which a pulse is of duration of a maximum of about 1000 picoseconds (such pulses containing spectral components of a frequency of up to about 1 GHz).

5. Apparatus of claim 1 in which at least a component of the said incoming radiation is at least quasi continuous, i.e., is CW for a period corresponding with many cycles.

6. Apparatus of claim 5 in which the said radiation includes two frequencies.

7. Apparatus of claim 6 in which at least a part of the said variation in radiation intensity is the result of the difference signal developed from beating of the two said frequencies.

8. Apparatus of claim 7 in which the two said frequencies are separated by a frequency difference of a minimum of 1 MHz.

9. Apparatus of claim 1 in which the said electrical polarization is induced by a field external to the said body.

10. Apparatus of claim 1 in which the said polar environment is due to spontaneous polarization.

11. Apparatus of claim 10 in which the said absorbing species is a dopant contained within the said body.

12. Apparatus of claim 11 in which the absorption length is a maximum of 0.1 cm and in which the absorbing species has a ground state dipole moment within the said body of at least 0.1 Debye.

13. Apparatus of claim 1 in which said body is a radiator so that the said altered energy is radiated.

14. Apparatus of claim 13 in which the said second means includes a transmission line.

15. Apparatus of claim 14 in which the said transmission line is essentially nondispersive.

16. Apparatus of claim 15 in which the said transmission line is provided with separated conductive elements so as to cause propagation of a TEM mode.

17. Apparatus of claim 15 in which the said transmission line is electro-optic.

18. Apparatus of claim 17 in which the said second means includes means for irradiating the said transmission line with radiation within the transparency bandwidth of the said transmission line in a direction orthogonal to the said electrical impulse for at least a portion of the period of traversal of the altered energy within the said line so that the transmission properties of the said transmission line for the irradiating radiation are altered during the period of coincidence between the said altered energy and radiation incident on the transmission line due to the said irradiation.

19. Apparatus of claim 18 in which the said altered energy is detected as a response to the said change in transmission properties.

20. Apparatus of claim 1 in which the electrical impulse includes a carrier with an imposed modulation signal corresponding with at least a component of the said variation in radiation intensity.

* * * * *

UNITED STATES PATENT AND TRADEMARK OFFICE
CERTIFICATE OF CORRECTION

PATENT NO. : 3,899,428

DATED : August 12, 1975

INVENTOR(S) : David H. Auston and Alastair M. Glass

It is certified that error appears in the above-identified patent and that said Letters Patent are hereby corrected as shown below:

Column 3, line 40, "heterodyneing" should read --heterodyning--;
line 63, after "a" insert --macroscopic--.

Column 5, line 42, "centimeter" should read --centigrade--.

Column 6, line 10, "are absorbed" should read --absorb--;
lines 28-29, "neonoydrate" should read --monohydrate--;
line 64, "in" should read --of--.

Column 7, line 46, "heterodyneing" should read --heterodyning--;
line 54, after "multiplied" the word --by-- should be inserted;
"(etalon)" should read --etalon--.

Column 10, line 53, "neglibible" should read --negligible--.

Column 11, lines 36-38, the words "concerned with prosaic devices readily available to illustrate the inventive effect. It has, however, been indicated" should be deleted.

Column 11, line 54, "heterodyneing" should read --heterodyning--.

Signed and Sealed this

Fourteenth Day of December 1976

[SEAL]

*Attest:*

RUTH C. MASON
*Attesting Officer*

C. MARSHALL DANN
*Commissioner of Patents and Trademarks*